March 4, 1952 W. G. KOGEL 2,587,629
ABSORPTION REFRIGERATION
Filed Dec. 15, 1944
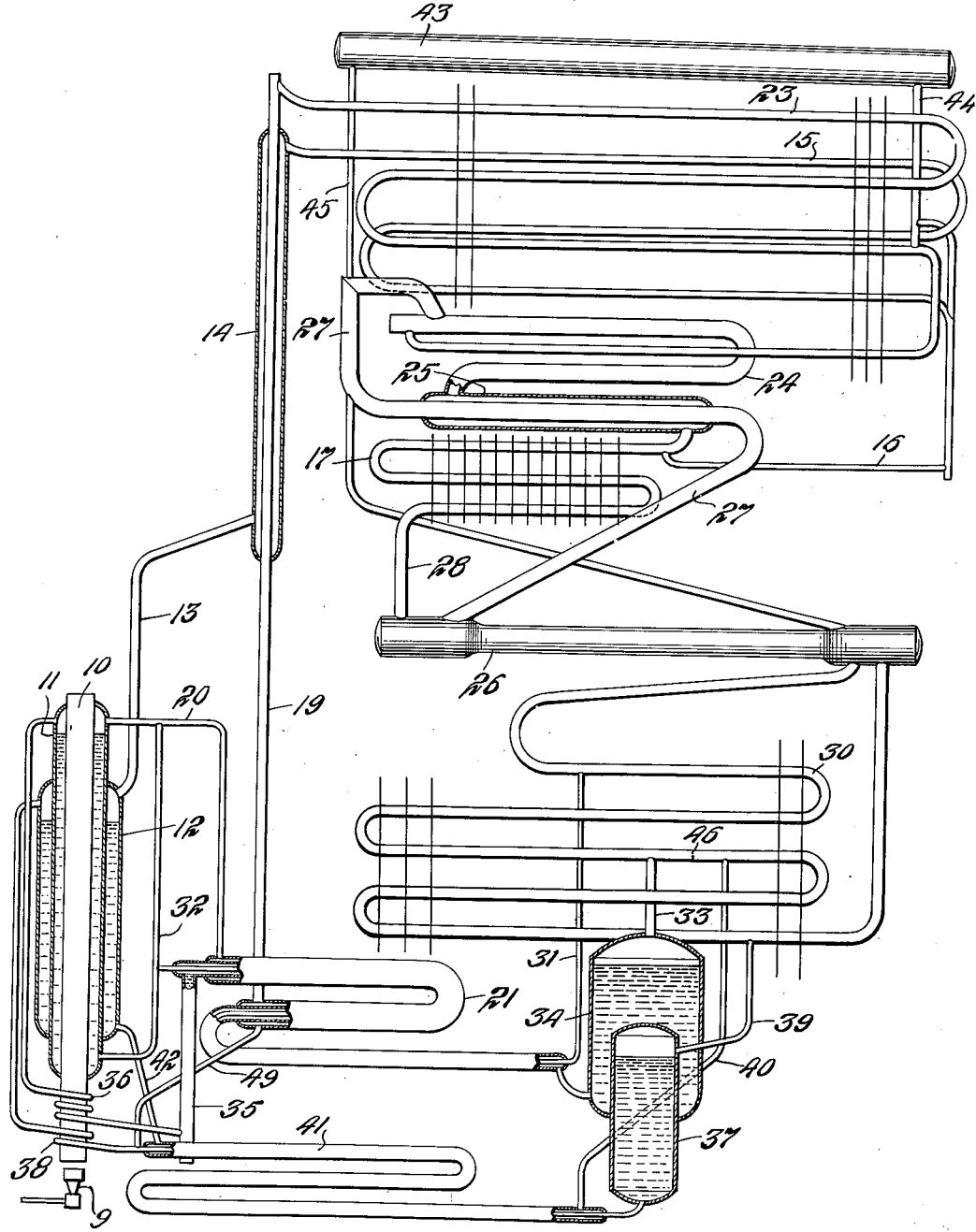
INVENTOR.
Wilhelm Georg Kogel
BY
D. E. Heath
his ATTORNEY Patented Mar. 4, 1952

2,587,629

UNITED STATES PATENT OFFICE 2,587,629

ABSORPTION REFRIGERATION

Wilhelm Georg Kögel, Stockholm, Sweden, assignor to Aktiebolaget Elektrolux, Stockholm, Sweden, a corporation of Sweden Application December 15, 1944, Serial No. 568,270
In Sweden August 3, 1944

13 Claims. (Cl. 62—119.5)

The invention relates to refrigeration, and more particularly to apparatus and a method of generating cold with the aid of an absorption refrigerating system of the kind in which an inert gas flows through one or more evaporators, at the same time absorbing refrigerant vapours at different temperatures. The invention has for its object to improve the efficiency of such refrigerating apparatus.

It has previously been known in absorption refrigeration systems of the inert gas type to make use of the temperature gradient produced in evaporators of such systems. In such evaporators liquid refrigerant evaporates and diffuses into inert gas which circulates therethrough, and evaporation of refrigerant takes place at different temperatures along its path of flow depending upon the partial pressure of the refrigerant vapor contained in the inert gas. Analogous conditions are to be found also in the absorber of the apparatus. From a thermic point of view it is favourable to carry out the process of absorption in such a manner that the absorption will take place as near the point of equilibrium of the gas and liquid phases as possible. From the same point of view it is equally of great advantage to use solutions of different refrigerant concentrations for the different temperature intervals. The present invention is characterized chiefly in that two or more streams of absorbent are used for the absorption of the refrigerant vapours from the inert gas, these streams having different refrigerant concentrations when entering the absorber.

The invention will in the following be more fully described with reference to the accompanying drawing which shows diagrammatically a device for carrying out the method according to the invention.

The drawing shows diagrammatically an absorption refrigerating apparatus operating with a pressure-equalizing gas, such as hydrogen, said apparatus containing water as absorbent and ammonia as refrigerant. Reference character 10 designates the flue of the apparatus, 11 its main boiler and 12 an auxiliarry boiler. Both boilers thus receive heat from a heat source of the apparatus, the boiler 12 to a certain extent receiving heat through the medium of the main boiler 11. The heat source 9, which may be a gas burner, for example, supplies heat externally of the refrigeration system to cause expulsion of vapor in the boilers or places of vapor expulsion 11 and 12. From the auxiliary boiler 12 the boiler vapours flow through a conduit 13 and a rectifier 14 to a condenser coil 15 from which the condensate formed flows through a conduit 16 into an evaporator 17. From the vapour space of the boiler 11 the vapours are conveyed through a conduit 20, a heat exchanger 21 and a conduit 19 to a second condenser 23 from which the condensate flows into a low temperature evaporator 24 connected in series to the evaporator 17 through the medium of a heat exchanger 25. The two evaporators 17 and 24 are connected to the gas circulation system of the apparatus in such a manner that the gas coming from the absorber and poor in refrigerant flows through a gas heat exchanger 26 and a conduit 27 into the upper part of the evaporator coil 24. Part of said conduit 27 is in the heat exchanger 25. In this manner, the gas flowing to the evaporator 24 is pre-cooled by the gas flowing to the evaporator 17. From the evaporator 17 the gas flows back through a conduit 28 and the gas heat exchanger 26 into the absorber.

The absorber 30 of the apparatus is built up of a tubular coil which, like the condenser, is air-cooled and arranged with or without cooling flanges. The absorption solution is introduced into the upper part of the coil through a conduit 31. This solution flows from the boiler 11 through a conduit 32 and the heat exchanger 21 to the absorber, and is extremely poor in refrigerant, because its refrigerant concentration may be reduced to 10 to 12 per cent. After passing through the upper part of the absorber coil, this solution is blocked as by a simple dam in the coil section 46, and is led through a conduit 33 to an absorber vessel 34 from which the now somewhat enriched solution is supplied through the heat exchanger 21 and a conduit 35 to a thermosiphon pump 36 which raises the solution to the boiler level in the boiler 11.

The lower part of the absorber coil receives absorption solution through a conduit 40 which, by a second liquid heat exchanger 41 and a conduit 42, communicates with the lower part of the boiler 12. The solution flowing through the conduit 40 into the absorber is relatively rich, as it may have a refrigerant concentration of 25 to 28 per cent. Through a conduit 39 the rich absorption solution is led off from the absorber to a second absorber vessel 37 from which the rich solution, which after passing through the absorber may have a concentration of 38 to 40 per cent., is supplied through the inner tube of the heat exchanger 41 to a second thermosiphon pump 38. This pump raises the solution to the level in the auxiliary boiler 12.

As regards the liquid heat exchanger 21 it should be pointed out that in it rich and poor solution as well as boiler vapours exchange heat in known manner, the condensate precipitated from the vapour being drained off by a conduit 49 to the pump 38. For the ventilation of the inner conduit of the heat exchanger 21 said conduit is, through the conduit 32, connected in free communication with the vapour space of the boiler 11. The device may also be provided with a pressure-equalizing vessel 43 which, through conduits 44 and 45, is connected in known manner to the condenser and gas circulation system of the apparatus.

The arrangement described operates substantially as follows: The refrigerant vapours expelled in the main boiler 11 and condensed in the condenser 15 are supplied to the evaporator 17 which is intended to operate at relatively high temperatures and which is used chiefly for cooling the space of a refrigerator cabinet. The separate supply of refrigerant ensures that the high temperature evaporator 17 always receives sufficient amounts of refrigerant, no matter whether the load on other evaporators of the refrigerating apparatus is high or low. This will also ensure a continuous supply of sufficient amounts of liquid refrigerant to the low temperature evaporator 24, the boiler vapours from the boiler 12 condensing in the condenser part 23 and flowing direct into said evaporator. The gas coming from the evaporators and rich in refrigerant vapour flows, as already mentioned, through the conduit 28 and the heat exchanger 29 to the lower part of the absorber 30, and passes through the absorber in counter-current to the absorption solution flowing through it. Thus, the rich gas first meets the relatively right solution which flows through the conduit 40 into the lowest coils of the absorber. The partial pressure in the gas is, however, so high that the absorbent capacity of the relatively rich solution is sufficient for effecting the necessary reduction of the partial pressure of the refrigerant vapour in the gas. It is obvious that from a thermic point of view such a system, in which a relatively rich solution is boiled off and and in which the vapours are condensed and again evaporated at relatively high temperatures and then again absorbed by a relatively rich solution, offers great advantages. On the other hand, the gas which gets poorer after passing through the lowest coils of the absorber meets in the upper coils of the absorber the extremely poor solution which enters through the conduit 31. This will obviously materially reduce the partial pressure, so that the refrigerant in the low temperature evaporator 24 into which said gas poor in refrigerant first flows evaporates at an extremely low temperature.

The arrangement has, however, also other advantages afforded by the division of the absorption and boiler solution into different concentration circuits. As is evident from the drawing, the draining of the triple exchanger 21 through the conduit 49 is very simple, as is also the case with the ventilation of the different conduits of said exchanger. This makes it possible to arrange with simple means a triple exchanger which is very efficient from a thermic point of view, that is an exchanger in which rich and poor solution as well as boiler vapours mutually exchange heat.

The invention is not limited to the embodiment shown and described, but may be changed in many respects within the scope of the invention, which is set forth in the following claims.

I claim:

1. A refrigeration system utilizing an inert pressure equalizing gas, a refrigerant fluid, and liquid absorbent, said system comprising a circuit for inert gas including a plurality of evaporator sections and a plurality of absorber sections arranged in this circuit for flow of gas therethrough in series, a plurality of separate circuits for the absorption liquid, each including one of said absorber sections and a boiler in each of which the same refrigerant fluid is expelled from solution in the absorbent liquid, a plurality of refrigerant liquefiers, each connected to receive vapor from a respective boiler and deliver liquid to one of said evaporator sections, and means for heating said boilers to respectively different temperatures to supply to said absorber sections absorption liquid having respectively different concentrations of the same refrigerant fluid.

2. A refrigeration system as set forth in claim 1 in which one of said boilers receives heat from the heating means by transfer through another of said boilers.

3. A refrigeration system as set forth in claim 1 having a liquid heat exchanger in each of said circuits for absorption liquid, and in which vapor flowing from one of said boilers toward a condenser is conducted in heat exchange relation with a liquid heat exchanger, thus forming a triple heat exchanger, and in which condensate from the triple heat exchanger is drained into another of said circuits for absorption liquid.

4. A refrigeration system as set forth in claim 1 in which said absorber sections are arranged in the direction of flow of inert gas in said gas circuit in the order of decreasing concentrations of absorption liquid in the circuits in which said absorber sections are included.

5. That improvement in the art of the refrigeration with the aid of a refrigeration system which comprises maintaining first and second bodies of absorption solution having the same kind of refrigerant in solution therein and in one of which the concentration of refrigerant in solution is different from that of the other, flowing only liquid in the first body of solution in a first circulatory path of flow, flowing only liquid in the second body of solution in a second circulatory path of flow, introducing absorption solution in said first and second paths of flow in different places of absorption for absorbing the refrigerant vapor from a mixture of such vapor and inert gas, rejecting heat of absorption at said different places of absorption only to a medium external to the system, and introducing into each of said places of absorption a mixture of inert gas and refrigerant vapor having a different partial pressure of the refrigerant vapor.

6. That improvement in the art of refrigeration with the aid of a refrigeration system which comprises circulating absorption solution in a plurality of circuits in each of which the solution is always out of physical contact with the solution circulating in the other circuits, flowing absorption solution from places of vapor expulsion in said circuits in a plurality of paths of flow, heating solution in each of said places of vapor expulsion by heat external to the system to produce in each of said paths of flow solution having a concentration of refrigerant different from the concentration of the same refrigerant in the solution in the other paths of flow, introducing absorption solution from each of said paths of flow in a different place of absorption for absorbing the refrigerant vapor from a mixture of inert gas and such vapor, rejecting the heat of absorption at each of said places of absorption only to a medium external to the system, and introducing into each of said places of absorption a mixture of inert gas and refrigerant vapor having a different partial pressure of the refrigerant vapor.

7. That improvement in the art of refrigeration with the aid of a refrigeration system which comprises circulating absorption solution in first and second circuits in each of which the solution is always out of physical contact with the solution circulating in the other circuit, flowing absorption solution from places of vapor expulsion in said circuits respectively in first and second paths of flow, heating solution in both of said places of vapor expulsion by heat external to the system to produce in said first path of flow solution having a concentration of refrigerant higher than the concentration of the same refrigerant in the solution in the second path of flow, introducing absorption solution from said first and second paths of flow into first and second places of absorption, respectively, for absorbing the refrigerant vapor from a mixture of inert gas and such vapor, rejecting heat of absorption at each of said places of absorption only to a medium external to the system, and introducing a mixture of inert gas and the refrigerant vapor into said first place of absorption at one partial pressure of refrigerant vapor and into said second place of absorption at a lower partial pressure of refrigerant vapor.

8. That improvement in the art of refrigeration with the aid of a refrigeration system which comprises circulating absorption solution in first and second circuits in each of which the solution is always out of physical contact with the solution circulating in the other circuit, flowing absorption solution from places of vapor expulsion in said circuits respectively in first and second paths of flow, heating solution in both of said places of vapor expulsion by heat external to the system to produce in said first path of flow solution having a concentration of refrigerant higher than the concentration of the same refrigerant in the solution in the second path of flow, introducing absorption solution from said first and second paths of flow into first and second places of absorption, respectively, for absorbing the refrigerant vapor from a mixture of inert gas and such vapor, rejecting heat of absorption at said first and second places of absorption only to ambient air, and flowing a mixture of inert gas and said refrigerant vapor successively through said first and second places of absorption.

9. That improvement in the art of refrigeration with the aid of a refrigeration system which comprises circulating absorption solution in first and second circuits in each of which the solution is always out of physical contact with the solution circulating in the other circuit, flowing absorption solution in first and second paths of flow from places of vapor expulsion which are in heat exchange relation, heating solution in both of said places of vapor expulsion to produce in said first path of flow solution having a concentration of refrigerant lower than the concentration of the same refrigerant in the solution in the second path of flow, introducing absorption solution from the first path of flow into a first place of absorption for gravity flow therethrough from a first level to a second level, introducing absorption solution from the second path of flow into a second place of absorption for gravity flow therethrough from substantially the second level to a lower level, rejecting heat of absorption at said first and second places of absorption only to ambient air, and flowing a mixture of inert gas and refrigerant vapor upwardly through the second place of absorption and thereafter upwardly through the first place of absorption.

10. That improvement in the art of refrigeration with the aid of a refrigeration system which comprises circulating absorption solution in at least two independent circuits and flowing solution in such circuits respectively in first and second paths of flow, heating solution in said first and second paths of flow by a common source of heat external to the system to produce in said first path of flow solution having a concentration of refrigerant higher than the concentration of the same refrigerant in the solution in the second path of flow, introducing solution from the first and second paths of flow into first and second places of absorption, respectively, for absorbing said refrigerant vapor from a mixture of inert gas and such vapor, circulating inert gas in a circuit in which the refrigerant evaporates and diffuses into the inert gas, and flowing such mixture of refrigerant vapor and inert gas to the places of absorption and introducing such mixture into the first place of absorption at a higher partial pressure of the refrigerant vapor and into the second place of absorption at a lower partial pressure of the refrigerant vapor.

11. In the art of refrigeration with the aid of a refrigeration system having at least two absorption liquid circuits in each of which liquid circulates through a different place of vapor expulsion and a different place of absorption, an inert gas circuit in which inert gas circulates through at least two places of evaporation and the places of absorption, and at least two places of liquefaction each connected to receive vapor from a different place of vapor expulsion and deliver refrigerant respectively to different places of evaporation, that improvement which comprises circulating liquid absorbent in one of said circuits out of physical contact with the liquid absorbent in another circuit, supplying to a first place of absorption liquid absorbent having a concentration of refrigerant higher than the concentration of the same refrigerant in the liquid absorbent supplied to a second place of absorption, heating the places of vapor expulsion to different temperatures to supply to the places of absorption liquid absorbent having such different concentrations of the same refrigerant, and circulating inert gas in its circuit so that the mixture of refrigerant vapor and inert gas flowing from the places of evaporation and having the highest partial pressure of refrigerant vapor is initially supplied to the first place of absorption.

12. In the art of refrigeration with the aid of a refrigeration system having two absorption liquid circuits in each of which liquid circulates through a different place of vapor expulsion and a different place of absorption, an inert gas circuit in which inert gas circulates through the places of absorption and successively through first and second places of evaporation, and first and second places of liquefaction each connected to receive vapor respectively from first and second places of vapor expulsion and deliver refrigerant respectively to the first and second places of evaporation, that improvement which comprises circulating liquid absorbent in one of said circuits out of physical contact with the liquid absorbent in the other circuit, supplying to a first place of absorption in one absorption liquid circuit liquid absorbent having a concentration of refrigerant lower than the concentration of the same refrigerant in the liquid absorbent supplied to a second place of absorption in the other circuit, heating the first place of vapor expulsion to a higher temperature than the second place of vapor expulsion to supply to the places of absorption liquid absorbent having such different concentrations of the same refrigerant, circulating inert gas in its circuit so that gas flowing from the places of absorption and having the lowest partial pressure of refrigerant is initially supplied to the first place of evaporation and the mixture of inert gas and refrigerant vapor flowing from the places of evaporation and having the lowest partial pressure of refrigerant vapor is initially supplied to the second place of absorption and then to the first place of absorption.

13. In the art of refrigeration with the aid of a refrigeration system having at least two absorption liquid circuits in each of which a solution of ammonia in water circulates through a different place of vapor expulsion and a different place of absorption, an inert gas circuit in which hydrogen gas circulates through at least two places of evaporation and the places of absorption, and at least two places of liquefaction each connected to receive vapor from a different place of vapor expulsion and deliver refrigerant respectively to different places of evaporation, that improvement which comprises circulating solution in one of said circuits out of physical contact with the solution in the other circuit, supplying to a first place of absorption solution having a higher concentration of ammonia than that in the solution supplied to a second place of absorption, heating the places of vapor expulsion to different temperatures to supply to the places of absorption solution having such different concentrations of ammonia, and circulating inert gas in its circuit so that the mixture of hydrogen gas and ammonia vapor flowing from the places of evaporation and having the highest partial pressure of ammonia vapor is initially supplied to the first place of absorption.

WILHELM GEORG KÖGEL.

REFERENCES CITED

The following references are of record in the file of this patent:

UNITED STATES PATENTS

| Number | Name | Date |
|---|---|---|
| 1,757,578 | Lenning et al. | May 6, 1930 |
| 2,027,927 | Nelson | Jan. 14, 1936 |
| 2,267,283 | Lenning | Dec. 23, 1941 |
| 2,291,695 | Coons | Aug. 4, 1942 |

FOREIGN PATENTS

| Number | Country | Date |
|---|---|---|
| 317,334 | Great Britain | Aug. 12, 1929 |